May 26, 1964  R. C. KIDD  3,134,284
AUTOMATIC STRUCTURAL BAR PUNCHING MACHINE
Filed Sept. 25, 1958  8 Sheets-Sheet 1

Inventor
Robert C. Kidd

May 26, 1964 R. C. KIDD 3,134,284
AUTOMATIC STRUCTURAL BAR PUNCHING MACHINE
Filed Sept. 25, 1958 8 Sheets-Sheet 2

FIG. 3

Inventor
Robert C. Kidd

Fig. 12

United States Patent Office 3,134,284
Patented May 26, 1964

3,134,284
AUTOMATIC STRUCTURAL BAR PUNCHING
MACHINE
Robert C. Kidd, Elmhurst, Ill., assignor to Mississippi
Valley Structural Steel Company, Decatur, Ill., a corporation of Illinois
Filed Sept. 25, 1958, Ser. No. 763,255
6 Claims. (Cl. 83—413)

The present invention relates to improvements in machines for punching holes in steel bars used for various structural purposes and is more particularly concerned with such a machine which is automatically operable to punch holes in predetermined spaced locations in long structural shapes such as angular, channel shaped and flat bars.

In fabrication of structural steel bars for such uses as building framework, road construction, bridges, and the like, punching of bolt holes and other holes, involved in connecting the bars in a structural framework design with and to other components of the construction, creates problems not only in handling the oftentimes long and heavy bars, but also in the proper duplication of punchings in a quantity of similar bars.

An important cost factor is imposed where a plurality of workmen must work together during punching operations, and this is aggravated where considerable setting up shutdown of the machine is involved for various types of work pieces and hole spacings.

It is accordingly an important object of the present invention to provide an improved efficient, high speed, automatically operable structural bar punching machine including novel means for efficiently handling the structural members and which is simple and easy to set up for specified punching spacings.

Another object of the invention is to provide improved structural member punching apparatus having novel means for one-man loading and operation.

A further object of the invention is to provide an improved structural member punching machine having novel automatic hole spacing means.

Still another object of the invention is to provide an improved structural member punching machine having novel template and indexing means for predetermining the spacing of holes to be punched in the member throughout a substantial maximum length for efficient automatic operation.

A still further object of the invention is to provide improved means in a hole punching machine for structural bars to enable quick change-over for punching holes in different flanges of angular cross-section bars.

Yet another object of the invention is to provide an improved bar handling and ejecting means for automatic spaced hole punching machines.

Other objects, features and advantages of the present invention will be readily apparent from the following detailed description of a preferred form thereof taken in conjunction with the accompanying drawings, in which.

Figures 1, 2:
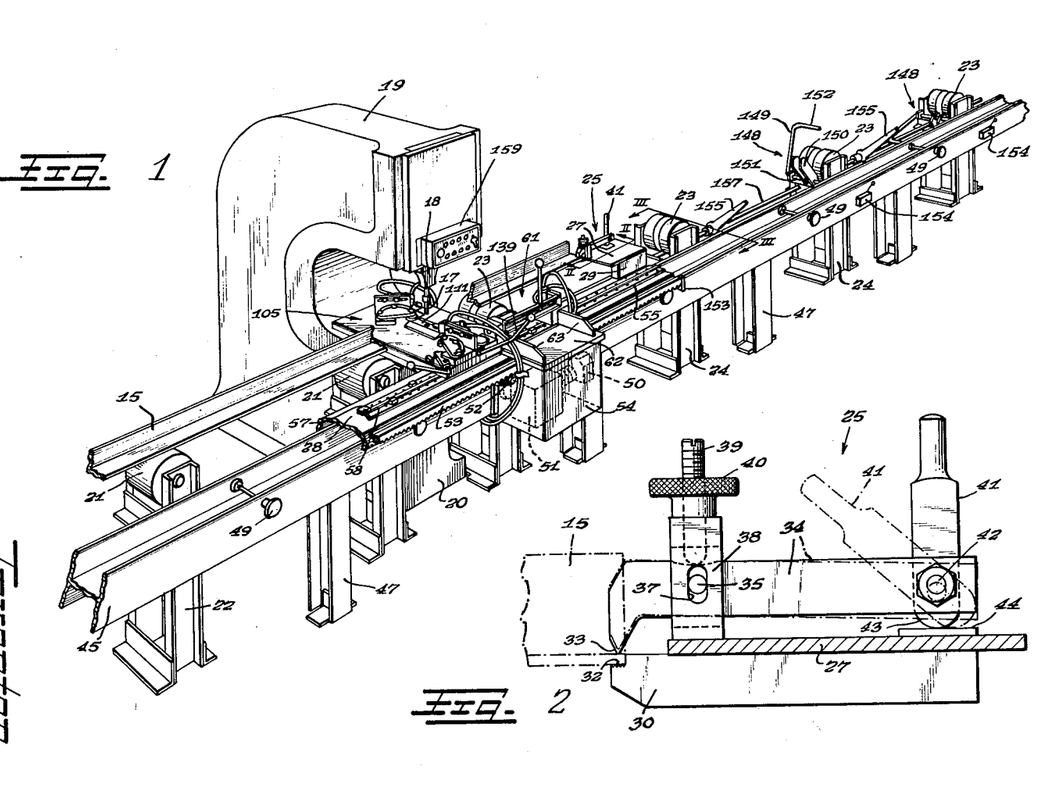
FIGURE 1 is a fragmentary perspective view of an automatically operable structural bar punching machine embodying features of the invention and with certain parts broken away and in section to illustrate details of structure.
FIGURE 2 is an enlarged fragmentary sectional elevational view of the work gripper of the machine taken substantially on the line II—II of FIGURE 1.

Referring to FIGURE 1, a machine embodying features of the invention is preferably constructed and arranged for handling structural bars such as steel bars 15, of which an angular section bar is shown by way of example, for punching through the bars at predetermined intervals holes of suitable size for receiving attaching or connecting means such as bolts, screws and rivets by which the respective bars are connected to other structural components and into a structure in which the bars are utilized. While the machine is well adapted for punching holes in either or both of the flanges of an angle bar of the kind depicted, it is equally well adapted for punching holes in flat bars, or in the webs of channel bars or other shaped bars or beams in which a flange or longitudinal part of the bar is exposed accessibly to a punch 17 vertically reciprocably supported by a ram 18 carried by the head portion of a suitable C-frame type structural punch unit 19 having under the punch head an anvil portion 20.

According to the present invention, the machine is adapted to handle and punch holes where desired in the flanges of the bar 15 substantially throughout its length. In practice bar lengths up to forty feet have been handled for punching but there is no limit upon practical bar lengths for which the machine capacity may be predetermined. To this end, the machine is equipped with a suitably spaced series of supporting idler rollers 21 mounted rotatably on roller standards 22 on one side of the punch unit 19, and a spaced series of idler rollers 23 carried by standards 24 on the opposite side of the punch unit. Each of the series of rollers 21 and 23 includes a sufficient number of rollers spaced at predetermined intervals such as five feet or less for a distance of as many feet from the respective sides of the center line of the punch unit 19 as desirable to handle bars to be punched of as great length as desired. This enables each of the successive bars 15 to be punched to be supported throughout its length and rolled into successive positions under the punch 17 and over the anvil 20 from end-to-end of the bar.

Figure 3:
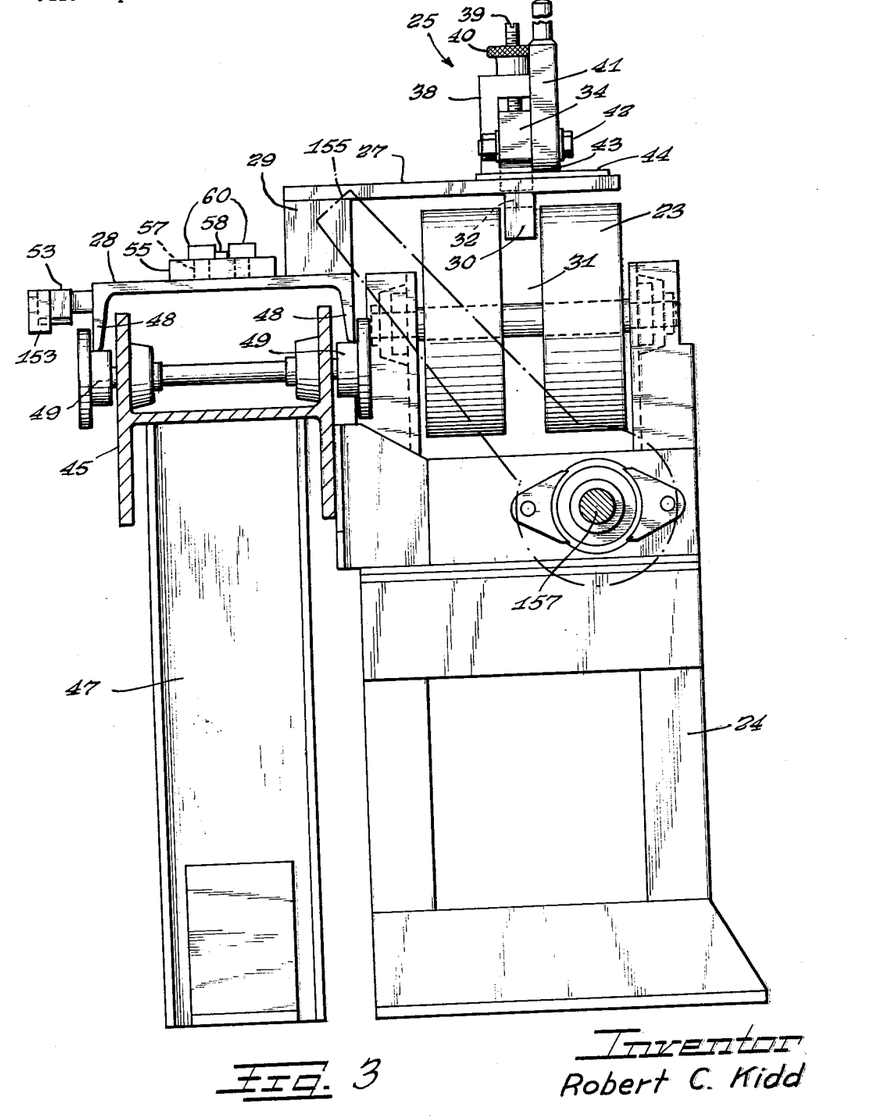
FIGURE 3 is an enlarged fragmentary vertical sectional elevational detail view taken substantially on the line III—III of FIGURE 1.

Means are provided for automatically advancing the bar 15 to be punched longitudinally from end-to-end under the punch 17, with suitable dwells at predetermined points along the length of the bar for punching of holes therein by the punch 17. For this purpose, a work gripper 25 is provided for engaging one end portion of the bar 15 mounted on a suitable carriage 27 supported by a travelling template carrier 28. In the present instance, the gripper 25 is shown as disposed at the right side of the punch unit 19 so as to be in a position to pull the bar 15 to be punched along the supporting rollers 21, under the punch 17 and onto the supporting rollers 23. In a convenient arrangement, the template carrier 28 is located in front of the punch unit 19 and the rollers 21 and 23, and the carriage 27 is in the form of a cantilever plate rigidly attached to the template carrier 28 through a spacer bar 29 and extending therefrom rearwardly into overlying relation to the rollers 23 and with the gripper 25 fixedly carried in longitudinal orientation centrally over the rollers 23 and aligned with a vertical axial plane through the punch 17 and extending through the centers of the rollers 21 and 23 (FIGS. 1 and 3).

In a practical construction, the gripper 25 comprises a fixed anvil bar 30 secured as by welding fixedly to the underside of the carriage plate 27 (FIGS. 2 and 3) disposed to project below the upper peripheries of the bar supporting rollers 23 which are for this purpose provided with respective suitable central grooves or gaps 31 to clear the gripper anvil bar 30. At its end portion nearest the punch unit 19, the gripper anvil bar 30 has a serration toothed or otherwise roughened upwardly facing fixed gripping jaw surface 32 disposed in substantially a plane with the tops of the peripheries of the supporting rollers 23. Coactive with the fixed jaw 32 is a bill-like releasable depending head jaw 33 on a pivotally mounted adjustable jaw bar 34. Releasing and clamping pivotal movement of the jaw bar 34 is on trunnions 35 located in adjacent but spaced relation to the jaw head 33 and projecting from the sides of the bar through vertically elongated respective bearing apertures 37 in an upright bearing frame 38 carried by the plate 27. The vertical dimension of the bearing apertures 27 is such as to afford a range of vertical jaw adjustment through a thrust pin 39 threaded through the top of the frame 38 and having a lower thrust end engageable slidably thrustingly against the opposed top of the jaw bar 34 and held in its adjusted position by a lock nut wheel 40.

Actuation of the jaw bar 34 to open and close the jaw 33 is effected through a cam latch lever 41 pivotally connected by means such as a pin or bolt 42 to the opposite end portion of the jaw bar 34 from the jaw 33 and having on its lower end a cam surface 43 engageable with a hardened thrust plate 44 mounted on the top of the carriage plate 27. When the latch lever 41 is in the full line position, action of its cam end 43 against the plate 44 pivots the jaw 34 about the trunnion pivot 35 to swing the jaw arm 33 down toward the fixed jaw 32 to grip the end portion of the bar interposed therebetween firmly, proper adjustment having been made by manipulation of the thrust member 39 and the lock nut member 40 for the thickness of the bar to be gripped. For releasing the bar 15 from the gripper, the latch lever 41 is swung down, as indicated in dash outline so that the attached end of the jaw bar 34 may swing down and thus raise the movable jaw 33 or at least release its grip from the engaged end portion of the bar 15. Re-engagement of the gripper with another one of the bars 15 is easily effected by inserting the end portion of the bar into the gripper jaws and then moving the latch lever 41 into the erect full line position wherein effective gripping of the bar to be punched between the jaws 32 and 33 results from the fairly long leverage between the fulcrum afforded by the trunnions 35 and the thrust tip of the member 39 and the jaw bar end raising cam portion 43 of the latch lever.

In an efficient form, the template and gripper carrying member 28 is in the form of an inverted channel of suitable width and of a length at least as long as the maximum length of bar to be punched, the gripper carriage 27 being mounted on the head or leading end portion of the carrier 28. As best seen in FIGURES 1 and 3, a suitable supporting and guiding structure for the carrier 28 comprises a continuous longitudinal frame 45, herein in the form of a continuous H-beam extending the full length of the machine forwardly alongside the series of rollers 21 and 23 and in front of the punch unit anvil 20 and carried by a suitably spaced series of supporting columns 47. The upstanding flanges of the frame member 45 are spaced apart less than depending longitudinal side flanges 48 of the carrier 28 and support flanged pairs of idler rollers 49 upon which the lower, free edges of the carrier flanges 48 ride for longitudinal reciprocable movement of the carrier 28 over the supporting frame 45.

Means for reciprocably advancing and returning the carrier 28 comprise powered actuating means including a hydraulic motor 50 and a reduction gear mechanism 51 driven thereby and drivingly connected to a gear 52 (FIG. 1) meshing with a rack 53 secured to the outer side and substantially throughout the length of the carrier 28. A housing 54 for the motor 50 and the reduction gear mechanism 51 is mounted upon the supporting frame 45 preferably adjacent to the starting position side of the punch unit 19.

On its upper face, the carrier 28 has secured longitudinally centrally thereof a template strip plate 55 extending throughout the length of the carrier and provided with two uniformly spaced relatively longitudinally alternately offset parallel series of upwardly opening template bores 57 (FIGS. 1, 3 and 7) located on respectively opposite sides of a narrow longitudinally extending divider and scale strip 58 on the upper surface of which suitable graduations by inches or other desirable scale indicia may be provided. Selectively engageable in the holes 57 are respective stems 59 of gauge or template pin blocks 60 by which holes to be punched in the bars 15 are gauged. It will be observed in FIG. 7 that the pin stems 59 of the gauge or template blocks 60 are offset from the center toward one end of each of the blocks so that by reversing the blocks with respect to any given one of the holes 57, different scale alignment can be effected with each opposite end of the block. By preference, the blocks 60 are of rectangular form with opposite flat sides engageable with the divider strip 58 which thereby holds the blocks against turning out of the selected orientation.

Coactive with the template blocks 60 is indexing mechanism 61 which is constructed and arranged to control an electro-hydraulic circuit, presently to be described, for properly successively positioning the bar 15 to be punched with respect to the punch 17. For this purpose, the motor housing 54 carries a top plate 62 of substantial rigidity lying along its inner margin over the near or outer margin of the template carrier 28 and supporting adjacent to its opposite side margins respective supporting arm bars 63 which project into overlying relation to the central portion of the carrier 28 and more particularly the template strip 55. For maximum stability, extension portions of the table plate 62 may extend in underlying relation to the bars 63, with a cutout opening 64 exposing the carrier member 28 and the template strip 55.

Upstanding from the rearward extension side marginal portions of the table plate 62 and secured to the respective bars 63 are journal standard block columns 65 each of which carries a respective journal pin or rod member 67 on its upper end portion projecting toward the opposite journal rod member 67 and carrying a respective bearing block 68. Fixedly secured to and spanning between the bearing block 68 is a supporting bar 69 carrying on its end portion nearest the punch a decelerator control 70 and on its opposite end portion a releasable stop device 71. On its upper side the bar 69 carries a handle 72 by which it can conveniently be rocked about the axis of the journals 67 for coaction with either selected one of the series of template blocks 60 on either side of the gauge strip 58.

For maintaining the indexing mechanism 61 oriented with respect to either selected side of the median gauging strip 58, releasable detent means are provided for holding the supporting bar 69, and thereby the deceleration and stop control devices 70 and 71 supported thereby, in either of the two selective positions into which the bar 69 may be rocked about the journals 67. To this end, a depending detent carrying arm 73 (FIGS. 7 and 8) is secured to the bearing block 68 adjacent to the deceleration control device 70 and more particularly is disposed between the deceleration control device and the adjacent table-carried bar 63. An adjustably tensionable, yieldable detent 74 carried by the lower end portion of the arm 73 is selectively engageable in either of a pair of similar detent receiving pocket recesses 75 in a suitable detent bearing plate or block 77 carried by the adjacent face of the bar 63. Adjustable stop pins 78 carried by fixed bracket projections 79 on the bar 63 adjacent opposite sides of the detent recess or pocket block 77 are engageable with the arm 73 for positively preventing overrun during shifting of the indexing mechanism rockably from one to the other orientation relative to the templates. The detent 74 holds the mechanism against unintentional rocking displacement from the selected orientation.

Figure 9:
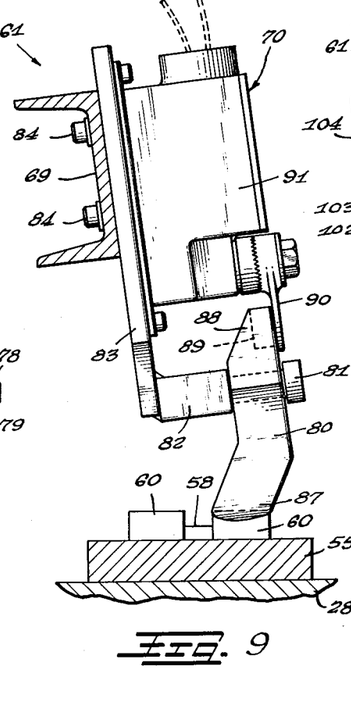
FIGURE 9 is a fragmentary vertical sectional elevational view taken substantially on the line IX—IX of FIGURE 7.

It is desirable normally to have the carrier 28 and thereby the clamping device 25 travel forwardly at as high as practicable speed for rapid movement of the bar 15 to be punched into its various predetermined positions to be punched by the punch 17. In a typical installation, a speed of 90 ft. per minute has been utilized but even faster speeds are practicable. It is the function of the deceleration control device 70 to decelerate the carrier 28 to a creep speed sufficiently in advance of bringing the carrier to a complete stop to avoid jarring the machine when the carrier is brought to a complete stop with the bar 15 to be punched in the predetermined accurate position along its length to be punched. For this purpose, the deceleration control device 70 includes a trip arm lever 80 (FIGS. 7 and 9) pivotally attached by a pivot pin 81 to a supporting bracket block 82 on the lower end portion of a mounting plate 83 secured in adjusted relation longitudinally along the bar 69 by means of screws 84 extending through respective selected ones of a series of appropriate apertures 85 provided in the bar 69. On its lower end portion the trip arm 80 has a trip finger 87 which depends into the path of movement of the template members 60.

Figure 7:
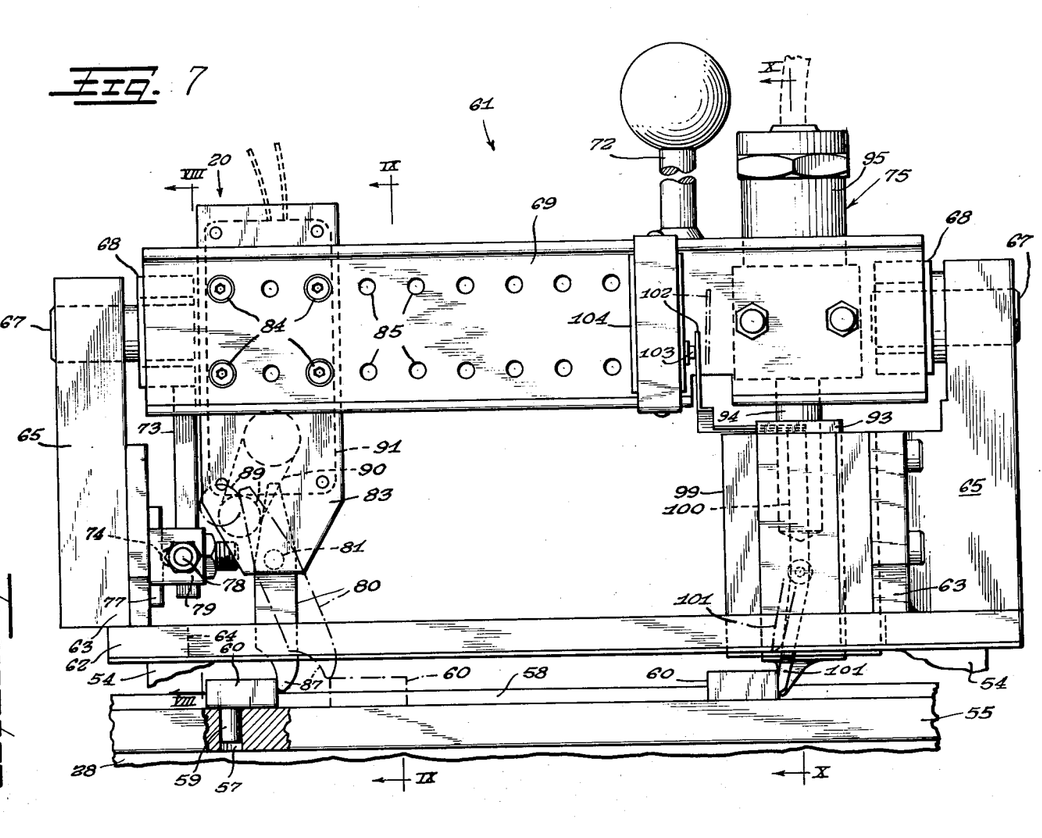
FIGURE 7 is an enlarged fragmentary elevational view of the adjustable hole spacing indexing control mechanism of the machine.
Figure 8:
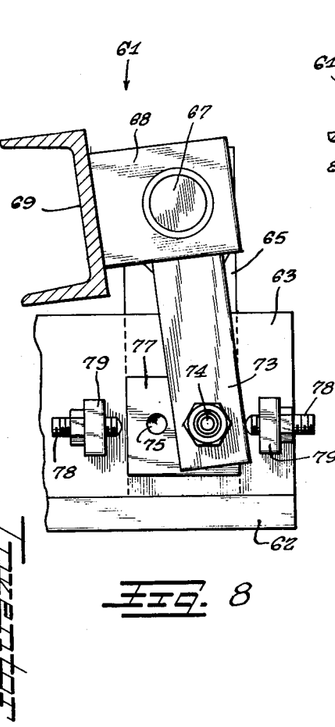
FIGURE 8 is a vertical fragmentary sectional elevational detail view taken substantially on the line VIII—VIII of FIGURE 7.

As one of the template members 60 is carried forwardly against the trip arm finger 87, the trip arm is swung about its pivot 81, as shown in FIGURE 7 from the full line position to the dash outline position. This carries an upper end trip head 88 on the trip arm swingingly against an engagement lug 89 on an actuating arm 90 of an electrical control limit switch within a housing 91 carried by the plate 83 above the trip arm. Swinging of the switch arm 90 actuates the switch to control the operating circuit for the machine and decelerate movement of the carrier 28 to creep speed.

Figure 10:
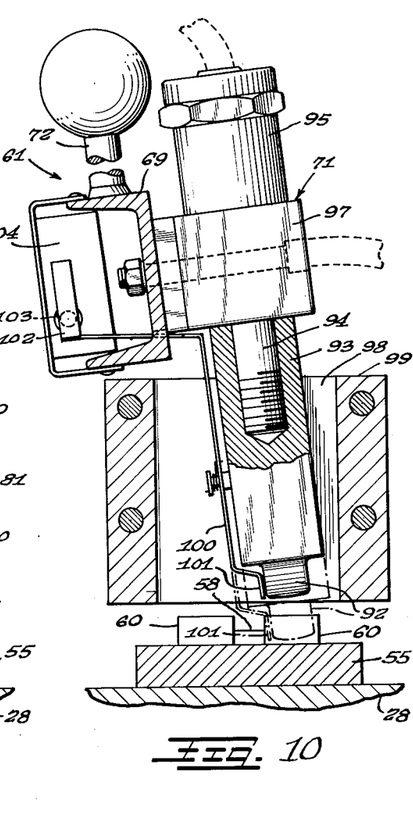
FIGURE 10 is a vertical fragmentary sectional elevational view taken substantially on the line X—X of FIGURE 7.

At creep speed, the carrier 28 advances the template member 60 which has just tripped the arm 80 until the template member abuts a stop finger 92 interposed in its path and carried by a vertically reciprocable plunger 93 mounted on the lower end of a piston rod 94 projecting from a fluid operator such as a hydraulic piston 95 carried by a supporting block mounted on the index device bar 69. Normally the plunger 93 is in the depressed downwardly projecting position shown in full lines in FIGURE 7 and in dot-dash outline in FIGURE 10 wherein the finger 92 is in stopping position relative to the template member 60 that advances toward it. Actuation of the fluid operator 95 withdraws the plunger 93 from stopping position into the full line position shown in FIGURE 10 to release the engaged template member 60 from the stop finger 92.

In order to withstand stopping thrust pressures thereagainst without distortions while nevertheless enabling swinging adjustment of the stop pin or finger plunger 93 for orientation with either series of the template members 60, the opposite sides of the plunger 93 are flat and are slidably engaged by opposed guide bearing surfaces 98 of a rigid guide and buffer frame 99 carried by the adjacent supporting bar 63. In a front to rear dimension the bearing surface space within the buffer frame 99 is sufficient to enable a full range of swinging adjustment of the plunger 93 while maintaining full buffer bearing engagement with the sides of the plunger.

In addition to carrying the stop pin or finger 92, the plunger 93 also preferably supports a rocker arm lever 100 normally spring urged to dispose a contact finger 101 rearwardly of the stop face of the stop finger 92 as shown in dash outline in FIGURE 7 to be engaged and swung forwardly by the template member 60 that comes into stopping engagement with the stop finger 92 for thereby swinging an actuating head 102 on the rocker arm into tripping engagement with a projecting trip pin 103 of a limit switch unit 104 carried by the bar 69 and in control of the operating circuit for a work gripping and holding device 105 (FIGS. 1 and 4) and also the control circuit for actuating the punch unit 19.

As the bar 15 to be punched comes to a stop under the punch 17, the gripping device 105 firmly grips the same and holds it against lateral misalignment or shifting relative to the punch. For this purpose, the gripping assembly 105 comprises a unitary assembly including a carrying plate 107 which is suitably secured as by means of screws 108 to a bolster 109 mounted on a bed plate or block 110 on the anvil 20 of the punch unit. A punch die 111 is carried by the bolster 109 and is cleared by a cut-out 112 in the carrying plate 107. It will be noted (FIG. 4) that the supporting block for the punch die 111 has a clearance notch 113 on the side facing toward the opening in the clearance cut-out 112 and also facing toward the gripper 25 of the machine whereby to receive the jaw end of the gripper anvil bar 30 as close as practicable to the die so that a hole can be punched quite close to the extremity of the bar 15 being worked upon.

According to the present invention, the work clamping device 105 is constructed and arranged for quick setting or resetting to accommodate work pieces of various widths or alternate flanges of the same work piece in successive punching passes through the machine. To this end, the clamping device 105 includes a pair of substantially identical relatively adjustable coactive, complementary clamping head units 114 mounted on respectively the front and rear portions of the supporting plate 107, in equally spaced respective opposite sides of the center line of work piece travel path as defined by the axis of the die 111. Each of the clamping heads 114 includes a work piece engaging and guiding as well as clamping roller 115, and a reciprocable pressing and work clamping plunger 117. The respective guiding and clamping rollers 115 and clamping plungers 117 of the two clamping heads 114 are so relatively disposed that in operation the respective rollers and plungers are coactively oriented in alignment with the punch die 111 on opposite sides of the bar 15 to be punched.

Figure 4:
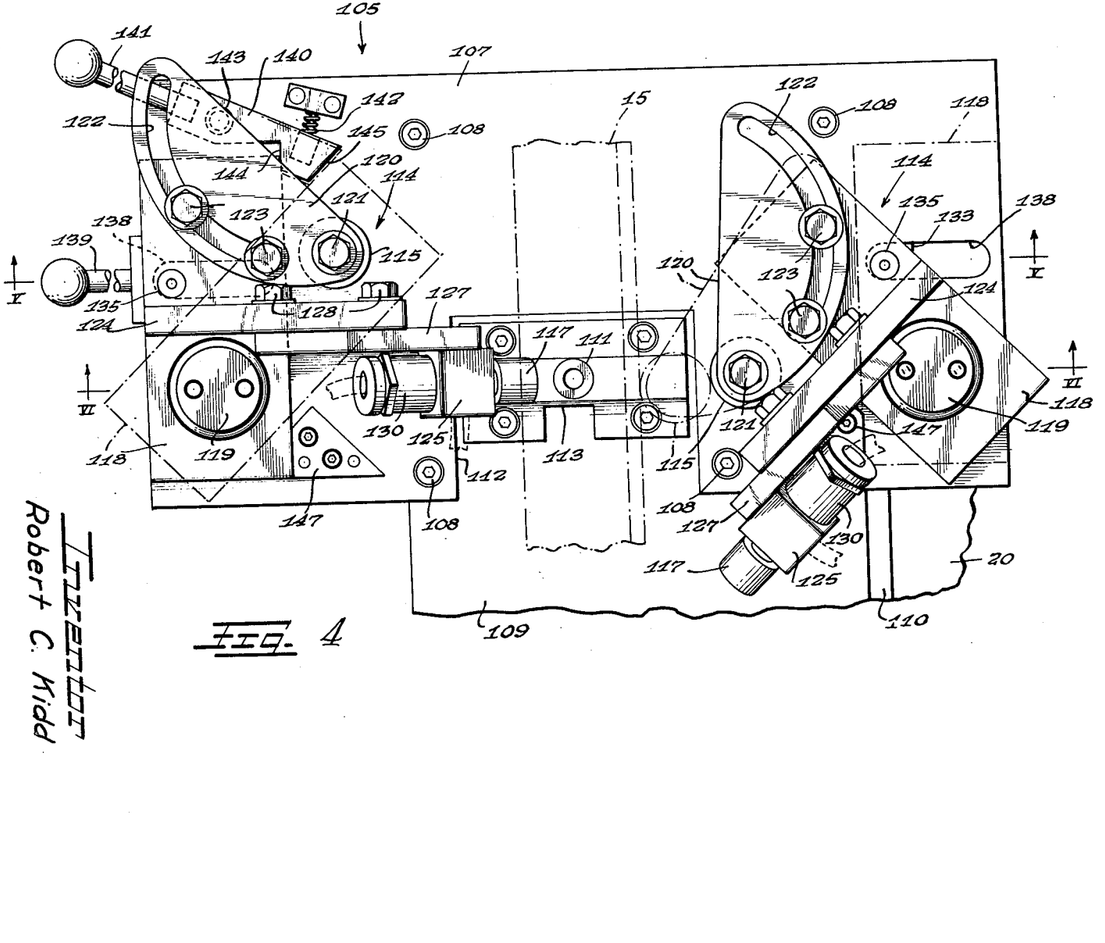
FIGURE 4 is a top plan view of the bar gripping and gauging mechanism of the machine.

Mounting each of the clamping heads 114 is a preferably rectangular base plate 118 slidably pivotally attached to the underlying portion of the supporting plate 107 by means of a fairly large, stable diameter journal 119, and with both of the journals having their axes in a plane extending through the axis of the punch die 111. A major portion of the base plate 118 extends beyond the pivot 119 toward the work approaching side of the base plate 107 and provides slidably adjustable support for a clamping roller carrying, preferably sector shaped, supporting plate 120 to one end portion of which the associated roller 115 is rotatably attached underneath the supporting plate by means of a suitable journal pin or bolt structure 121. Along its curved side margin, the supporting plate 120 has a radius slot 122 through which extends a pair of attaching bolts 123 by which the supporting plate 120 is clampingly fixedly secured in any of a substantial range of adjusted positions relative to the base plate 118 as permitted by the length of the radius slot 122. As shown in FIG. 4, the two supporting plates 120 are in adjusted relation for accommodating work pieces of maximum width. As shown in dash outline, the right-hand supporting plate 120 in FIG. 4 has been adjusted to accommodate a substantially narrower work piece.

Figure 6:
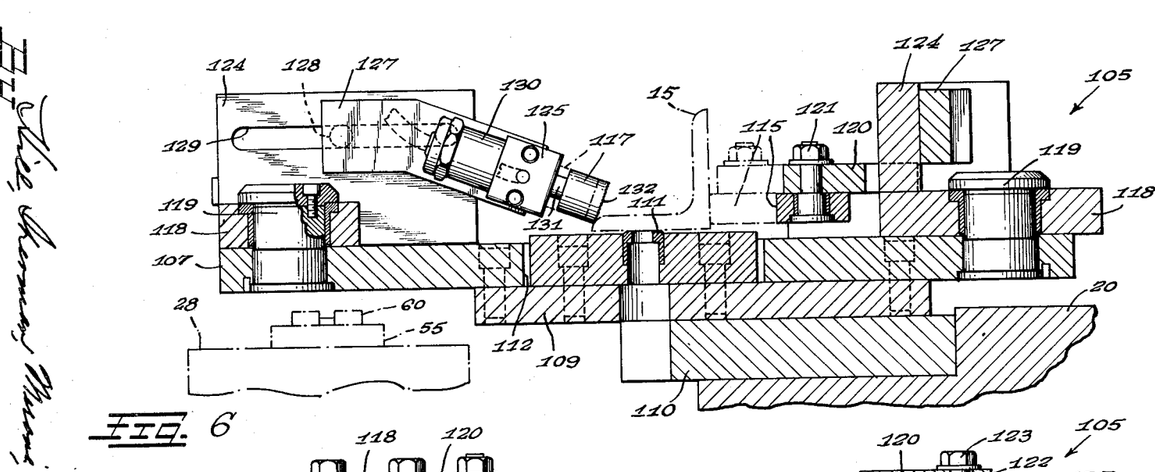
FIGURE 6 is a fragmentary sectional elevational detail view taken substantially on the line VI—VI of FIGURE 4.

Between the pivot 119 and the supporting plate 120 an upstanding fin-like supporting bracket plate 124 provides support for the plunger 117 which is carried by a mounting block 125 secured to an adjustable preferably dog leg shaped rigid carrying arm 127 (FIGS. 4 and 6) having an angled generally downwardly diagonal leg portion on which the mounting block 125 is carried and a generally horizontal leg portion which is secured by means such as bolts 128 to the bracket plate 124, the bolts extending through a horizontal slot 129 in the bracket plate whereby the plunger unit can be adjusted horizontally toward and away from the die 111 as required for accommodating various width work pieces. Also carried by the mounting block 125 on the opposite side from the clamping plunger 117 is a fluid operator such as a hydraulic cylinder 130 within which is a piston from which projects a piston rod 131 to which the plunger 117 is rigidly connected. As shown, the plunger 117 in each instance is in its projected, work clamping position, from which it is adapted to be retracted by actuation of the fluid operator 130 for releasing the work piece. By the downwardly directed oblique axis disposition of the plunger 117, a preferably roughened, knurled clamping end face 132 on the plunger is adapted to make efficient downwardly and transversely pressing clamping engagement with the opposed side of the work piece to press the work piece solidly against the die 111 and against the opposing clamping roller 115 which engages the work piece on its opposite side from the plunger.

Figure 5:
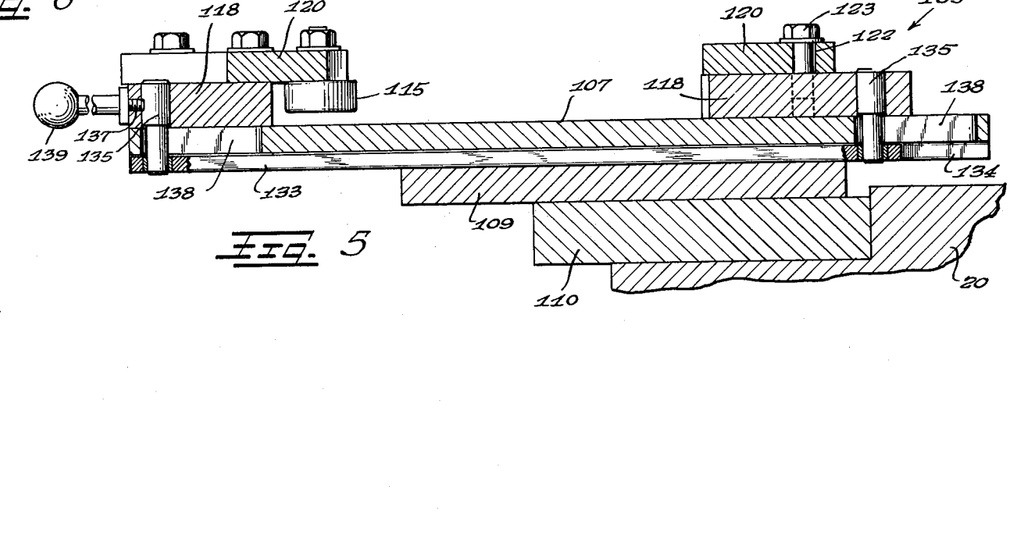
FIGURE 5 is a fragmentary vertical sectional detail view taken substantially on the line V—V of FIGURE 4.

Means are provided for relatively repositioning the two clamping heads 114 in coordination for alternatively disposing the opposing guiding and clamping rollers 115 and the clamping plungers 117 in coactive opposition. Herein this is effected by means of a connecting bar or rod 133 (FIGS. 4 and 5) longitudinally movably disposed within a downwardly opening groove 134 in the supporting plate 107 and extending in a front to rear direction spaced from the die clearance cut-out 112 toward the work approaching side of the supporting plate. A motion transmission connection of each of the base plates 118 with the connecting bar 133 is effected by means of a suitable connecting pin fixedly secured to the respective base plate 118 as by means of a set screw 137 and depending through a clearance slot 138 in the supporting plate 107 into pivotal engagement with the adjacent end portion of the connecting bar 133. Through this arrangement, the base plates 118 are adapted to be swung in coordinated relation about their respective pivots 119 so that the base plate 118 which extends generally parallel with its end portion of the supporting plate 107, as shown in FIG. 4, presents its clamping plunger 117 for engagement with the work piece, and the remaining base plate 118 is disposed in a diagonal position, generally swung toward the work piece to present its clamping roller 115 for engagement with the work piece in coactive relation to the opposing plunger 117.

Means are provided for effecting relative setting and then retention of such setting of the clamping heads 114, herein comprising manually operable structure but which may readily comprise automatic actuating and holding means. Convenient manual structure comprises a setting handle 139 (FIGS. 1, 4 and 5) attached to the forward side of the base plate 118 at the front of the work guiding and clamping device 105 and located in sufficiently offset relation to the axis of the pivot 119 for ease in swinging the associated base plate 118 through the range of setting and resetting movement desirable. By means of the handle 139 when it is desired to reset the clamping heads 114 from the full line position shown in FIGURE 4, grasping and swinging of the handle 139 clockwise, correspondingly swings each of the base plates 118 about its pivot 119 and reorients the clamping heads 114 into the dash outline positions of the base plates 118 as shown. The reverse, counterclockwise swinging of the handle 139 returns the clamping heads to the full line position shown.

In either operative setting of the clamping heads 114, holding means, herein in the form of a manually releasable latch 140 retains the assembly in the desired setting. In an effective form, the latch 140 comprises a lever pivotally mounted on the supporting plate 107 beyond the roller supporting end portion of the base plate and under the overlying end portion of the roller carrying sector plate 120, with an actuating handle 141 of the latch extending into convenient actuating position at the forward side of the machine. Biasing means in the form of a compression spring 142 thrusts the latch member 140 about a pivot 143 toward and into latching engagement with the contiguous base plate 118 so that in the setting shown in full outline in FIGURE 4 a latching shoulder 144 on the latch member engages with the adjacent corner of the base plate and thus holds the base plate against unintentional swinging out of the selected setting. During resetting of the clamping heads, the latch 140 is swung counterclockwise out of latching position by manipulating the handle 141 to overcome the biasing spring 142 to clear the latch from the engaged corner of the base plate 118 as shown in full outline. After the clamping heads have been reset into the dash outline position, the released latch 140 snaps into holding relation to the adjacent canted side of the associated base plate 118, being provided for this purpose with an end latching shoulder 145.

Coactive with the latch 140 in holding the clamping heads 114 in firm, stable selective setting, is a pair of fixed abutments 147 respectively disposed for engagement with the end portion of the clamping member side of each of the base plates 118 when the associated base plate is in its respective parallel disposition relative to the adjacent end of the supporting plate 107. For this purpose, the abutment 147 associated with the base plate 118 at the front side of the supporting plate 107 is carried by the supporting plate in position to be engaged by the associated base plate 118 in the full line position shown in FIGURE 4, while the remaining abutment 147 is carried by the supporting plate 107 in position to engage the associated base plate 118 when it is in the dash line position.

After the last hole has been punched in the bar 115 and the trailing end of the bar has been cleared from the punch, the bar is released from the gripper 25 and removed from the machine. This is preferably effected automatically by means associated with the work conveying section of the machine embodying the supporting rollers 23. To this end, a combination gripper release and bar stop unit 148 (FIG. 1) is activated at a suitable distance from the punch unit 19. By preference a plurality of the gripper release and stop units 148 is provided at suitably graduated longitudinally spaced intervals along the conveyor provided by the rollers 23 to accommodate various lengths of work piece. In each instance, the unit 148 comprises a generally inverted L-shaped release arm 149 and a stop bar structure 150, both mounted pivotally on a rock shaft 151 pivotally supported on one of the roller carrying standards 24 in suitable position to be moved from an out of the way, inactive position as shown at the far right end of FIGURE 1 into an active position as shown with the first of the units 148 in the series. In the active position, the arm 149 extends upwardly with a transverse angular head 152 disposed in the path of the gripper latch arm 41. As the carrier 28 moves the gripper 25 under the release arm head 152, the latch arm 41 is swung down by engagement with the release arm head and thus opens the gripper jaws to release the punched bar 15. The gripper 25 continues to move on and the stop bars 150 engage the end of the bar 15 and positively strip the same from the gripper, should there be any tendency to stick in the gripper jaws, and more importantly to restrain the bar against possible momentum induced onward travel.

Figure 11:
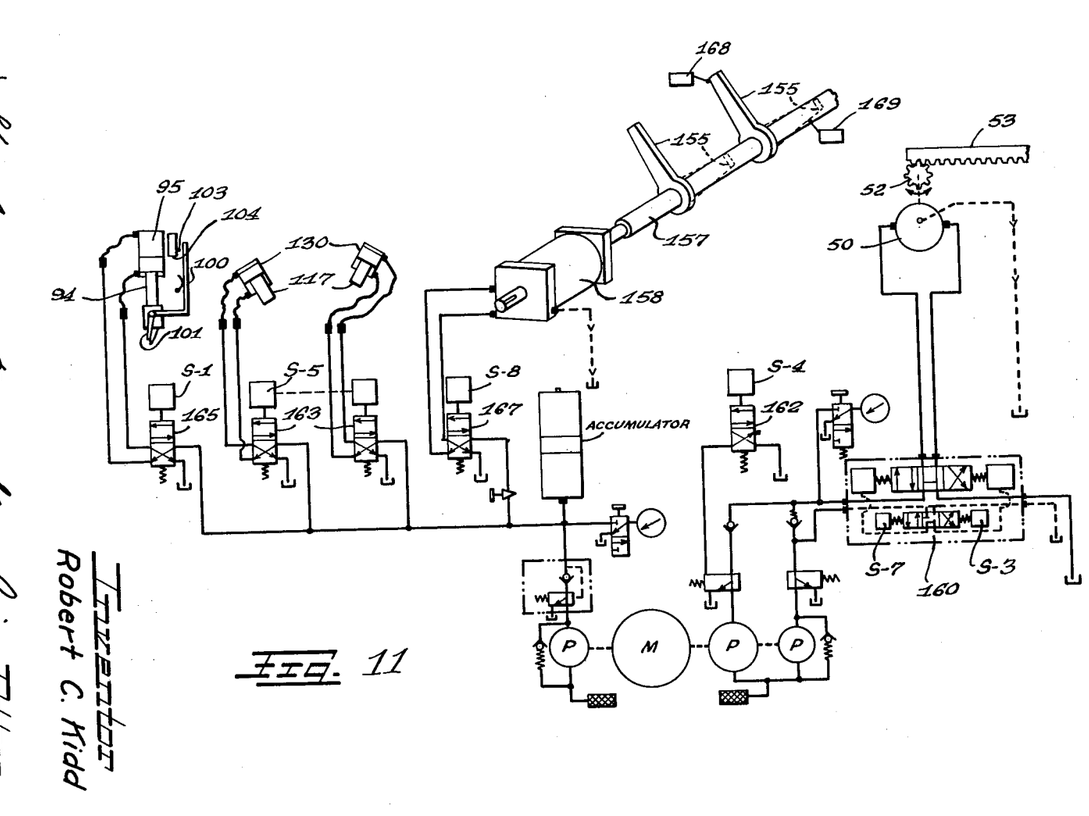
FIGURE 11 is a more or less schematic electrohydraulic operating diagram.

Close to the point where the gripper 25 is released from the bar 15 by the release and stop mechanism unit 48, a trip finger 153 carried by the advancing end of the rack 53 engages and trips the actuating arm of a limit switch 154 which not only controls the operating circuit of the machine to halt advance of the carrier 28 but also activates the circuit to operate a work ejector comprising a longitudinally spaced series of ejector arms 155 fixedly carried by a common shaft 157 (FIGS. 1 and 3) rotatably mounted on the roll supporting standards 24 and adapted to be rotated by suitable means such as a hydraulic motor 158 (FIG. 11). Normally the ejector arms are disposed to lie in clearance relation at the forward side of the advancing work piece. During ejecting or unloading action, the ejector arms 155 are swung toward the rear of the machine to thereby dump the punched work piece from the supporting rollers 23. At the end of their work unloading action, the ejector arms 155 are promptly returned to their starting or ready position, and the carrier 28 returns to its starting position for another working cycle.

Figure 12:
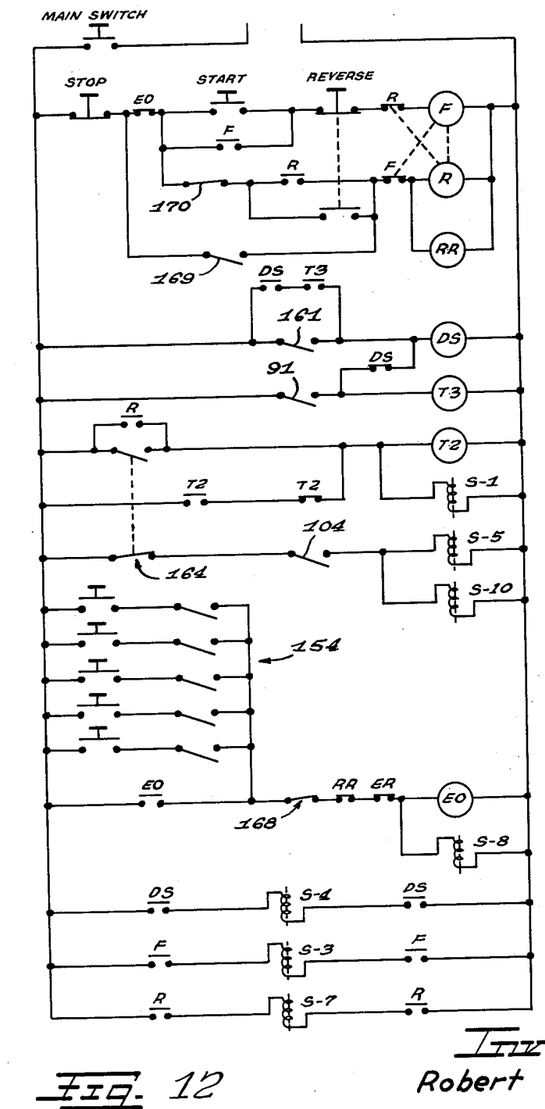
FIGURE 12 is a simplified electrical wiring diagram.

A combination of hydraulic and electrical circuits is utilized in cyclically, automatically operating the machine, and these circuits are shown schematically and diagrammatically in FIGURES 11 and 12. In the hydraulic circuit of FIGURE 11, standard symbols have been used. A simplified electrical diagram is shown in FIGURE 12. For ready correlated identification, the various contacts and switches controlled by the several relays and timers bear the same letter or letter and numeral combination references.

Assuming that the master switch has been closed and that the motor driving the several hydraulic pumps is operating and the carrier 28 is in starting position, the person operating the machine loads one of the work pieces 15 onto the rollers 21 (FIG. 1) and engages and locks the end of the work piece in the gripper 25, the forward or advance end portion of the work piece being guidably disposed between the clamping heads 114, with the operatively disposed clamping plunger 117 retracted by its fluid operator 130. The operator then pushes the "start" button to initiate an automatic cycle of operation of the machine as controlled by the electrical circuit of FIGURE 12. Should anything go wrong, the operator can instantly stop the machine by pressing the "stop" button. The various electrical circuit control buttons may be conveniently mounted on a control panel 159 carried by the front of the head of the punch unit 19 (FIG. 1) or on any other convenient place on the machine, such for example, as on the table 62 at the front of the machine.

Closing of the "start" switch closes the circuit for energizing relay F which generally controls forward movement of the carrier 28 by closing switches F to energize a solenoid S–3 which motivates hydraulic control valve mechanism 160 (FIG. 11) for opening a hydraulic circuit to drive the hydraulic motor 50 for moving the carriage 28 forwardly. Since generally holes must be punched in the leading end portion of the work piece, it is desirable to advance the carrier at initially slow or creep speed, and therefore means (not shown) associated with the carrier 28 initially holds closed a normally open limit switch 161 controlling energizing circuit for a relay DS which while energized closes switch contacts in a circuit controlling a solenoid S–4 which is thus energized to open a pressure relief valve 162 whereby forward movement of the carrier 28 is at creep speed. Should there be no punching of the work piece required within a short travel span after starting of forward movement of the carrier 28, the limit switch 161 opens, deenergizing relay DS and thus the solenoid S–4 and as a result full hydraulic pressure to the motor 50 causing driving of the carrier 28 at rapid forward speed.

Upon tripping of the index mechanism arm 80 by an advancing one of the adjustably positionable template members 60 and closing of the limit switch 91, the circuit for energizing the relay DS is closed thus effecting energization of solenoid S–4 and forward movement of the carrier 28 at creep speed. This also effects energization of a timer T3 which acts to hold the energizing circuit for the relay DS closed after normally open limit switch 91 opens by advance of the tripping template member 60 beyond the trip arm 80 and toward the stop pin or finger 92 interposed in its path.

As the advancing template member 60 comes into engagement with the stop finger 92 it trips the switch actuating arm 100 and closes the normally open limit switch 104 thereby energizing a solenoid or solenoids S–5 for operating respective hydraulic control valves 163 for supplying hydraulic fluid to the hydraulic operators 130 and projecting the selected active clamping plunger 117 into clamping engagement with the work piece. At the same time there is energized a circuit for a solenoid S–10 in control of means by which the customary clutch associated with the punch unit 19 is activated to effect a punching stroke of the punch ram 18 and thus punching of the work piece 15 at the predetermined point by coaction of the punch 17 with the die 111.

On return of the punch 17 and its ram 18 from the punching stroke, a double acting relay switch 164 is suitably actuated thereby to deenergize the solenoids S–5 and S–10, thus effecting retraction of the work clamping plunger 117 and halting of the punch, and at the same time closing a circuit to energize a timer T2 and a solenoid S–1 by which a hydraulic control valve 165 is actuated to effect hydraulic return of the stop plunger 93 through action of the fluid operator 95. The timer T2 effects a time delay in deenergization of the solenoid S–1 long enough to clear the template member 60 from which the stop finger 92 has been released.

If a succeeding template member 60 now effects actuation of the limit switch 91, the carrier 28 moves forwardly at creep speed until another punching cycle is initiated by the limit switch 104. In the absence of an immediately acting template member 60, the carrier 28 moves forwardly at rapid speed until the next succeeding template member 60 acts on the trip arm 80.

After the work piece has passed beyond the punch press, and the gripper 25 has been released from the work piece and the work piece stopped by the release and stop mechanism 148, the carrier 28 moves on to the preselected limit switch 154. It may be observed that preselection is effected herein by means of a suitable manual switch, for each of the limit switches 154, located at the electrical control station afforded by the control panel 159.

Upon closing of the preselected limit switch 154 by the trip 153 of the carrier, a relay EO is energized, which effects deenergization of the relay F as well as the solenoid S–3 so that the hydraulic motor 50 is stopped and the carrier 28 halted. At the same time, the relay EO energizes a solenoid S–8 operating a hydraulic control valve 167 for directing hydraulic fluid to operate the hydraulic motor 158 to actuate the rock shaft 157 and thereby the ejector arms 155 to eject the punched work piece. At the end of the ejecting action of the arms 155, a limit switch 168 is opened to deenergize the relay EO and thus the solenoid S–8, whereby the hydraulic control valve 167 shifts to the ejector return position and the ejector arms 155 are swung back to the ready position wherein a normally open limit switch 169 is closed to energize relays R and RR and a solenoid S–7 is energized to actuate the control valve mechanism 160 for hydraulically reversing the hydraulic motor 50 for returning the carrier 28 at rapid speed toward starting position. Near the end of the return traverse of the carrier 28, the limit switch 161 is closed to energize the relay DS and thereby the solenoid S–4 for thereby slowing the carrier down to creep speed until the carrier effects opening of a limit switch 170 to deenergize the relays R and RR and thereby the solenoid S–7 to bring the carrier to a halt at starting position.

If it is desired to return the carrier 28 before the work piece has been released therefrom, as where double flange or double row punching of the work piece is to be effected, the operator actuates a "reverse" switch before the gripper 25 reaches the preselected release arm 149, 152. This causes the relay F to be deenergized and the relay R to be energized for rapid return of the carrier and the work piece still clamped in place relative thereto. When the carrier 28 has returned to its starting position and come to a stop, the work piece is reclamped to position the second longitudinal portion thereof to be punched, and the operator swings the index support bar 69 by means of the handle 72 into the second or alternate position from the position in which it was during the first punching run of the carrier. On pushing the "start" button, the carrier is advanced through another working cycle.

Although herein the machine is shown as including a punch press, which is especially well suited for making holes in light and medium weight materials, heavier materials may require a drill press for making the holes. It will be readily apparent that a drill press could be substituted for the punch press without significant change in structure of the other components of the machine. Therefore, "punching" should be considered herein as including drilling or other desirable hole or aperture forming expedient.

It will be understood that modifications and variations may be effected without departing from the scope of the novel concepts of the present invention.

I claim as my invention:

1. In a machine for automatically punching holes selectively in an elongated structural metal member, a punching assembly located in a fixed position, means for supporting a member to be punched in longitudinally movable position with relation to the punching assembly, a template carrier of a length at least as long as the member to be punched and having thereon template means for selectively determining the positions of holes to be punched along the length of the member to be punched, means for supporting the carrier for longitudinal movement in a path adjacent to and parallel to the path of movement of the member to be punched on the supporting means therefor, gripper means supported by the forward end portion of the carrier and including means for releasably gripping the forward end portion of the member to be punched, means for actuating the carrier longitudinally to advance the member to be punched relative to the punching assembly and including a motor, indexing mechanism mounted in relation to said path to be coactive with the template means on the carrier for dwell positioning the carrier and the member to be punched for accurately punching the predetermined series of holes in the member as predetermined by the template means, means including opposed members relatively separably mounted on respectively opposite sides of said path adjacent to the punching assembly and operative for gripping and clamping the member to be punched and holding it fixedly aligned with respect to the punching assembly during each dwell positioning afforded by indexing means and the coincident punching operation of the punching assembly, and combination hydraulic and electrical means operative for automatically actuating said motor and driving said carrier and actuating said punching assembly and said clamping means in coordinated cyclical relation as controlled by said coacting indexing means and template means to effect punching of all of said predetermined series of holes in said member in a continuous cycle of operation.

2. In apparatus of the character described wherein a template carrier having templates projecting upwardly therefrom at predetermined spaced intervals is movable along a predetermined path for controlling operations of the apparatus,
   means for driving the template carrier along said path and including an electrical circuit for controlling operations of the driving means,
   indexing mechanism for controlling the electrical circuit and including a supporting structure mounted in operative relation adjacent to said predetermined path,
   a control switch for said electrical circuit supported by said supporting structure,
   a trip arm pivotally carried by the supporting structure, said trip arm having a finger portion operatively disposed in the path of and engageable with said templates to be actuated thereby to swing said trip arm pivotally,
   and a switch operator carried by said supporting structure and engageable by said arm and arranged for actuation by the arm when the arm is pivoted by a template to operate the switch to control said circuit for thereby controlling operation of the driving means.

3. In apparatus of the character described wherein a template carrier having templates projecting upwardly therefrom at predetermined spaced intervals is movable along a predetermined path for controlling operations of the apparatus,
   means for driving the template carrier along said path and including an electrical circuit for controlling operations of the driving means,
   indexing mechanism for controlling the electrical circuit and including a supporting structure mounted in operative relation adjacent to said predetermined path,
   a control switch for said electrical circuit supported by said supporting structure,
   a trip arm pivotally carried by the supporting structure, said trip arm having a finger portion operatively disposed in the path of and engageable with said templates to be actuated thereby to swing said trip arm pivotally,
   and a switch operator carried by said supporting structure and engageable by said arm and arranged for actuation by the arm when the arm is pivoted by a template to operate the switch to control said circuit for thereby controlling operation of the driving means,
   said supporting structure including means for adjusting the position of said switch and said arm and said switch operator longitudinally along the path of travel of the template carrier.

4. In apparatus of the character described including mechanisms the operations of which must be controlled sequentially and having control means for controlling the sequential operation of the mechanisms and comprising a template carrier operatively mounted to move along a longitudinal path to present upstanding templates thereon for control purposes, the improvement which comprises:
   an electrical circuit for controlling operation of said mechanisms,
   a supporting structure mounted adjacent to the path of travel of the template carrier,
   a reciprocable plunger supported by said supporting structure and having an end portion disposed to extend into the path of movement of the templates,
   a switch connected into said electrical circuit for controlling the same and including a switch operating member supported by said plunger to move therewith and engageable by the template that engages the plunger,
   and means for reciprocating the plunger into and out of the path of the templates whereby in one position the plunger prevents movement of the template carrier by engaging a template and in another position the plunger clears the templates for free movement of the template carrier, said switch being operated upon engagement of the switch operating member by the plunger-engaged template to control operation of said electrical circuit to control operation of the mechanisms.

5. In apparatus of the character described wherein a template carrier having upstanding templates thereon at predetermined spaced intervals is operatively movable along a predetermined path for controlling operations of the apparatus, means for driving the template carrier along said path and including an electrical circuit for controlling operations of the driving means, said electrical circuit having a deceleration control portion, a supporting structure mounted adjacent to said path and rising thereabove, a deceleration control member mounted on said supporting structure in the path of movement of the templates and engageable by a template as the template carrier moves at high speed, a switch assembly connected operatively with said deceleration circuit portion and carried by the supporting structure and including means operable by said member upon engagement of the member by a template to actuate the switch assembly for affecting said deceleration circuit portion to control said driving means to move the template carrier at a decelerated speed, a reciprocable plunger carried by the supporting structure spaced from said control member in the direction of movement of the template carrier in said path and having a plunger portion disposed in the path of movement of the templates and engageable with a template after deceleration of the carrier to stop the carrier, and means for moving said plunger out of engagement with the template to release the template carrier for onward movement in said path.

6. Apparatus as defined in claim 4, wherein the template carrier has two longitudinally disposed parallel rows of templates, and said reciprocable plunger is supported by the supporting structure to pivot across said longitudinal path to dispose the plunger with its end portion into the path of movement of either of said rows of templates selectively.

References Cited in the file of this patent

UNITED STATES PATENTS

| | | |
|---|---|---|
| 805,192 | Gadd et al. | Nov. 21, 1905 |
| 980,241 | Gardner et al. | Jan. 3, 1911 |
| 1,036,695 | Patchell | Aug. 27, 1912 |
| 1,241,248 | Payne | Sept. 25, 1917 |
| 1,637,013 | Thomas | July 26, 1927 |
| 2,576,295 | Good | Nov. 27, 1951 |
| 2,656,887 | Judd | Oct. 27, 1953 |
| 2,690,800 | Ross | Oct. 5, 1954 |
| 2,729,447 | Groll | Jan. 3, 1956 |
| 2,914,977 | Verderber | Dec. 1, 1959 |
| 3,061,764 | Paul et al. | Oct. 30, 1962 |

FOREIGN PATENTS

| | | |
|---|---|---|
| 117,840 | Russia | May 15, 1905 |